Patented Aug. 18, 1942

2,293,410

UNITED STATES PATENT OFFICE 2,293,410

CONCRETE CURING COMPOSITION

Stanley S. Sorem, Oakland, Calif., assignor to Shell Development Company, San Francisco, Calif., a corporation of Delaware No Drawing. Application April 23, 1940, Serial No. 331,162

13 Claims. (Cl. 106—269)

In cement concrete construction it is desirable to retard the evaporation of water from the concrete for some time after it has been poured, so that the cement will become thoroughly hydrated and insure a concrete of great strength.

Several methods have been proposed for accomplishing this, among them being the construction of dykes to keep a layer of water over the surface of the concrete, and the use of various coverings such as straw, hay, burlap, canvas, etc. which can be kept wet and which retard evaporation from the concrete as well as protect the concrete from the direct rays of the sun. However, the method which has been found to be the most satisfactory comprises the use of thin, impervious hydrocarbon films such as asphalt or paraffin over the surface of the concrete to prevent evaporation. Such methods are disclosed in U. S. Patents 1,684,671; 1,767,533; 1,955,421 and 2,143,515 with several modifications. As this method is practiced at present either black asphalt or paraffin is diluted with a light hydrocarbon solvent to a fluid consistency and the resulting cut back is sprayed or brushed over the surface of the fresh concrete.

The black asphalt has very good water retention properties, but cannot be used in many applications, such as building, bridges, etc. due to its unsightly color. Further, the dark color renders the asphalt undesirable for use in hot climates, since it causes heat to be absorbed from the sun and allows the concrete to cure at too high a temperature. To avoid this difficulty, paraffin solutions are often used. They have a satisfactory color, but melt or crack and peel readily, and in addition do not have satisfactory water retaining properties, being in this respect much inferior to the black asphalt.

In my copending patent application Serial No. 288,809 filed August 7, 1939, now U. S. Patent No. 2,213,806, I have disclosed a satisfactory light colored concrete curing compound utilizing albino asphalt in the form of a cut back combined with various combinations of pigments and fillers. I have now discovered that still better compounds may be produced from albino asphalt by incorporating therein small quantities of water-insoluble soaps such as calcium stearate. The concrete curing compounds made with the water insoluble soaps give much better water retention, require less or no pigment and enable complete elimination of fillers if desired.

It is therefore an object of this invention to produce concrete curing compounds which are light in color, which retain moisture during the curing of the concrete and which chalk and rub off after they have served their function, so that the concrete is left in its natural color. Further objects will be apparent from reading the specification.

One of the big drawbacks of most concrete curing compounds, for example those made of paraffin wax, is that they do not form a tenuous film and therefore, as the concrete cures, they are drawn into the pores of the concrete and are thus rendered ineffective for retaining moisture. It has, however, been found that certain water insoluble soaps and particularly calcium stearate give the albino asphalt the properties which are normally associated with air blown asphalts, namely, a high penetration index. The calcium stearate causes a hard film to form which does not soften appreciably even in the presence of considerable heat and which retards penetration of the asphalt into the concrete. A further function of the water insoluble soap is to suspend the pigment throughout the mass of the curing compound and retard its settling out even during prolonged storage.

As an example of a curing compound made in accordance with the present invention, the following is given as an illustration:

A mixture was made consisting of the following:

| | Per cent |
|---|---|
| 13 penetration albino asphalt | 68 |
| Calcium stearate | 1.1 |
| Titanium dioxide | 5.4 |
| Kerosene | 25.5 |

In order to test the compound, small cylinders 2″ x 4″ of cement concrete were prepared according to the A. S. T. M. procedure for making concrete test specimens and immediately thereafter they are sprayed on all sides with the curing compound to be tested, weighed and placed in an oven having a constant temperature of 100° F. and a relative humidity of 15%. The amount of curing compound per unit of surface was the same for all specimens. At the end of 7 days the cylinders were again weighed to determine their moisture loss, allowance being made for the loss of solvent from the curing compound. Cylinders which were cured with black asphalt were given the basic rating of 1, since the black asphalts have proved satisfactory from a moisture retention viewpoint, and the moisture loss of the other was expressed as:

$$\frac{\text{Loss of moisture in test specimen}}{\text{Loss of moisture in specimen cured with black asphalt}}$$

In another test to measure resistance to light absorption, samples of cement concrete were prepared and coated with various curing compounds and thermometers were imbedded in the fresh concrete and the samples were exposed to sunlight. Since the paraffin treating compounds are satisfactory from the standpoint of heat reflection the samples coated with paraffin were given the rating 1, and the heat absorption of the other sample was expressed as $$\frac{\text{Temperature of test sample-air temperature}}{\text{Temperature of paraffin coated sample-air temperature}}$$

In a similar manner a light absorption test was made in which the new compound was compared with black asphalt.

According to the above methods of rating, the lower the rating number, the better is the curing compound. On this basis the above-mentioned new concrete curing compound gave a relative moisture retention of 0.6. The heat absorption of the new compound was 1.3 when compared with the paraffin curing compound and .5 when compared with the black asphalt.

It has been found that titanium dioxide is the most effective pigment which may be used for the purposes of this invention and it may be used in quantities from about 4 to 40% by weight or preferably from about 5 to 10%. Zinc sulfide has also been found to be a suitable pigment and it may be substituted for the titanium dioxide using 8 parts of the zinc sulfide where 5 parts of titanium dioxide would normally be used. Other white or light colored pigments may be used, although many pigments are undesirable for technical reasons when the curing compound is stored for any length of time before use. For instance, magnesium oxide will react with the sulfur naturally present in the asphalt to form dark colored compounds, while heavy pigments such as lead salts settle out rapidly in storage. The use of such pigments is, however, not excluded when the compound is prepared for immediate use. Although with calcium stearate a filler such as talc has been found to be unnecessary, it may in some instances be advantageously employed. The talc may be used either in place of the pigment or for substituting for a portion of the pigment.

The albino asphalt used in this invention should have an A. S. T. M. color of not more than 3½ when determined by dilution to .1% with a suitable substantially colorless solvent such as carbon tetrachloride, benzene, etc. The production of albino asphalt from asphaltic and mixed base crude oils by solvent extraction and distillation methods is well known in the art, suitable method being set out in U. S. Patent 2,091,496 of Merrill, 2,114,796 of Crawley and the patent application of Anderson, Serial No. 186,133 filed January 21, 1938. Curing compounds even superior for my purpose may be obtained by the use of transparent albino asphalts which are bleached by the incipient hydrogenation of ordinary albino asphalts. By bleaching is meant a mild or incipient hydrogenation of albino asphalt by heating the asphalt in the presence of hydrogen under pressure. Very little of the hydrogen reacts with the asphalt, and the viscous properties of the asphalt are substantially unchanged, but the color is greatly improved. These bleached albino asphalts are so light in color that the natural color of the concrete shows through, and therefore the need for a pigment is eliminated. The harder albino and bleached albino asphalts are preferred, particularly those having A. S. T. M. penetrations at 77° F. of 50 or less, and especially good results are obtained with those asphalts having penetrations of less than 10.

To illustrate the total elimination of pigments from the curing compound the following example is given.

To a cut back bleached albino asphalt was added 1.5% of calcium stearate and it was tested according to the above procedure. The moisture retention was found to be 1. when compared with black asphalt, and the heat retention to be 1.3 when compared with the paraffin curing compound.

For the purposes of the present invention a calcium soap is preferred although the soaps of other light alkaline earth metals such as magnesium, strontium or barium or another light metal aluminum or zinc may be used. The preferred soap is made from stearic acid, but other saturated or unsaturated fatty acids having from 12 to 22 carbon atoms may be used. The amount of the calcium stearate or other water insoluble soap must be at least .1% by weight of the curing compound and may be increased to its solubility limit in the asphalt which is, in the case of calcium stearate, in the neighborhood of 2%; the preferred amount of the soap is about .5 to 1.5 based on the weight of the curing compound.

The use of water insoluble soaps in concrete curing compounds which contain albino asphalt is advantageous even when no pigment is used. If an unbleached albino is used the color will, of course, be fairly dark, but it will be much lighter than that of the black asphalts, and it will be found that the soap effectively prevents the asphalt from being drawn into the pores of the concrete.

The solvent which is used to cut back the asphalt may, for instance, be kerosene or other light petroleum cut. In general, lighter fractions give superior results, the lightness of the solvent being limited only by its flash point, which for the sake of safety should be at least 75° F. Besides the petroleum cuts, other solvents such as chlorinated and oxygenated hydrocarbons may be used. The amount of solvent which is used is just sufficient to render the asphalt sufficiently fluid to be readily brushed or sprayed on the surface of the concrete.

Curing compounds made according to the present invention have been found to produce a hard, light colored film on the surface of concrete which effectively retards the evaporation of water from the concrete. After several weeks the compound begins to chalk off, so that after the concrete has been in place for a month or so, no evidence of the curing compound is left.

When a pigment is used, the method of compounding the curing agent has been found to be important since if the calcium stearate is allowed to come into contact with the pigment before the pigment is dispersed through the asphalt the calcium stearate forms a coating on the pigment which prevents normal chalking. It has therefore been found best to first mix up the pigment, asphalt and about ⅔ of the kerosene and then add the calcium stearate which has been dissolved in the remainder of the solvent. To dissolve the calcium stearate in the kerosene, the kerosene is normally heated to about 180° C. and the calcium stearate is stirred in.

In use, the curing compounds of the present invention are sprayed or brushed over the surface of the concrete to be treated. Preferably this is done as soon as possible after the concrete is laid and before it attains its initial set, although it is helpful to apply the curing compound at any time before the concrete has dried out.

I claim as my invention:

1. As a concrete curing compound a solution in a cut back albino asphalt of a water isoluble soap chosen from the group consisting of magnesium, calcium, strontium, barium, aluminum and zinc soaps.

2. The concrete curing compound of claim 1 in which the albino asphalt is bleached by incipient hydrogenation.

3. The concrete curing compound of claim 1 in which is incorporated light colored pigment.

4. The concrete curing compound of claim 1 in which the soap is made from fatty acids having from 12 to 22 carbon atoms.

5. A concrete curing compound comprising a cut back albino asphalt with calcium stearate dissolved therein and a light colored pigment.

6. A concrete curing compound comprising a cut back albino asphalt with aluminum stearate dissolved therein and a light colored pigment.

7. A concrete curing compound comprising a cut back albino asphalt with zinc stearate dissolved therein and a light colored pigment.

8. A concrete curing compound comprising a cut back albino asphalt, with calcium stearate dissolved therein, and a light colored pigment in which the albino asphalt is cut back to the extent that it can be readily sprayed on the surface of concrete.

9. A concrete curing compound comprising a cut back albino asphalt, about 1% of a dissolved water insoluble soap of the group consisting of magnesium, calcium, strontium, barium, aluminum and zinc soaps, and 4% to 40% of a light colored pigment.

10. A concrete curing compound comprising a cut back albino asphalt, about .5% to 1.5% of a dissolved water insoluble soap of the group consisting of magnesium, calcium, strontium, barium, aluminum and zinc soaps, and 5% to 10% of a light colored pigment.

11. The concrete curing compound of claim 10 in which the pigment is titanium dioxide.

12. The concrete curing compound of claim 10 in which the pigment is zinc sulphide.

13. The concrete curing compound of claim 10 in which the albino asphalt has a penetration at 77° F. of not more than 50.

STANLEY S. SOREM.